US010783210B1

(12) United States Patent
Dhillon et al.

(10) Patent No.: US 10,783,210 B1
(45) Date of Patent: Sep. 22, 2020

(54) DYNAMIC GENERATION OF WEB BROWSER LINKS BASED ON COGNITIVE ANALYSIS

(71) Applicant: INTERNATIONAL BUSINESS MACHINES CORPORATION, Armonk, NY (US)

(72) Inventors: Jill Dhillon, Austin, TX (US); Tamer M. Nassar, Fairfield, CT (US); Gina Mazzarelli, New Windsor, NY (US); Michael Bender, Rye Brook, NY (US); Daniel Anthony DeMarco, Danbury, CT (US); Sherwin Yu, Bridgeport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/414,872

(22) Filed: May 17, 2019

(51) Int. Cl.
*G06F 16/957* (2019.01)
*G06F 16/958* (2019.01)
*G06F 17/18* (2006.01)

(52) U.S. Cl.
CPC .......... *G06F 16/957* (2019.01); *G06F 16/958* (2019.01); *G06F 17/18* (2013.01)

(58) Field of Classification Search
None
See application file for complete search history.

(56) References Cited

U.S. PATENT DOCUMENTS

| 7,660,815 | B1 | 2/2010 | Scofield | |
|---|---|---|---|---|
| 7,685,192 | B1 | 3/2010 | Scofield | |
| 7,966,395 | B1 | 6/2011 | Pope | |
| 8,566,696 | B1* | 10/2013 | Hamon | G06F 16/957 715/205 |
| 10,089,579 | B1* | 10/2018 | Hamon | G06F 40/134 |
| 2006/0059225 | A1 | 3/2006 | Stonehocker | |
| 2008/0027936 | A1* | 1/2008 | Liu | G06F 16/951 |
| 2009/0171928 | A1* | 7/2009 | Stergiou | G06F 16/951 |
| 2009/0222737 | A1* | 9/2009 | Liesche | H04L 67/22 715/738 |
| 2013/0036344 | A1 | 2/2013 | Ahmed | |
| 2014/0358826 | A1* | 12/2014 | Traupman | G06N 5/048 706/11 |

(Continued)

*Primary Examiner* — Joshua Joo
(74) *Attorney, Agent, or Firm* — Schmeiser, Olsen & Watts; Michael A. Petrocelli (57) ABSTRACT

A cognitive Web browser detects that a user is viewing a Web page. The system captures contextual data that identifies the user, the Web page, temporal information, and the user's computer, location, and browser. Using artificially intelligent cognitive analytics, the system correlates the contextual data with patterns inferred from the user's past browsing habits to predict which page the user may want to view next and the paths to each of those destination. The system ranks each page on each path by its probability of being selected and displays the ranked pages as a dynamic hyperlinked list. The user may directly navigate to any of displayed pages with a single selection from the list. The contextual information, the dynamic list, and the user's selection are forwarded to a machine-learning application that uses the forwarded information to train the system to more accurately predict the user's future navigational preferences.

19 Claims, 6 Drawing Sheets

(56) References Cited

U.S. PATENT DOCUMENTS

| | | | | |
|---|---|---|---|---|
| 2016/0191355 A1* | 6/2016 | Joshi | ............... | G06F 9/541 |
| | | | | 709/219 |
| 2017/0026703 A1* | 1/2017 | Phadnis | ............... | G06Q 30/02 |
| 2017/0099340 A1* | 4/2017 | Li | ............... | H04L 67/06 |
| 2017/0300823 A1* | 10/2017 | Bostick | ............... | G06N 5/022 |
| 2017/0302979 A1* | 10/2017 | Kaya | ............... | G06F 16/70 |
| 2018/0004856 A1* | 1/2018 | Levi | ............... | G06F 16/958 |
| 2018/0032877 A1* | 2/2018 | Jain | ............... | G06N 5/022 |
| 2018/0033040 A1 | 2/2018 | Minnis | | |
| 2018/0246862 A1* | 8/2018 | Burkard | ............... | H04L 67/2852 |
| 2019/0373082 A1* | 12/2019 | Greenberg | ............... | H04L 67/2847 |
| 2019/0392071 A1* | 12/2019 | Rao | ............... | G06N 20/00 |
| 2020/0084225 A1* | 3/2020 | McKendall | ............... | H04L 63/145 |

\* cited by examiner

DYNAMIC GENERATION OF WEB BROWSER LINKS BASED ON COGNITIVE ANALYSIS

BACKGROUND

The present invention relates in general to Internet Web browsers and in particular to using cognitive analysis to reduce the number of hyperlinks a user must traverse in order to reach a desired Web page.

Internet Web browsers display content that contains embedded hyperlinks. A user who is viewing a first Web page selects a hyperlink on that page in order to display another Web page. On a complex Web site that contains numerous linked Web pages, navigating to a particular destination page can require numerous hyperlinks.

SUMMARY

Embodiments of the present invention provide methods, systems, and computer program products for an artificially intelligent, self-learning cognitive Web browser that perform a method for dynamic generation of web browser links based on cognitive analysis. This method comprises the Web browser detecting that a user is viewing a Web page. The system then captures contextual data that identifies the user, the Web page, temporal information like a current date, time, day, or month, and the user's computer, location, and browser. Using cognitive analytics, the system correlates the captured contextual data with patterns inferred from previously logged contextual data and from the user's past browsing habits to predict which page the user may want to view next and the paths that the user would be likely to traverse in order to reach each of those destination. The system ranks the pages on each path by the probability that the user will select that path, and increases the ranking of each path's final-destination Web page. The highest-ranked pages are displayed as a dynamic hyperlinked list. The user may directly navigate to any of displayed pages with a single selection from the list. The contextual information, the dynamic list, and the user's selection are forwarded to a machine-learning application that will later use the forwarded information to train the system to more accurately predict the user's future navigational preferences. The hyperlinked list may be continuously updated by repeating these steps each time the user links to a new Web page.

DETAILED DESCRIPTION

Embodiment of the present invention use an artificially intelligent mechanism of cognitive analytics to streamline a user's Web-browsing experience. This self-learning mechanism infers from a specific combination of contextual data items which Web pages a user is likely to desire and allows the user to link to that page with a single selection. This mechanism can greatly reduce the number of pages that a user must traverse when navigating a Web site.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
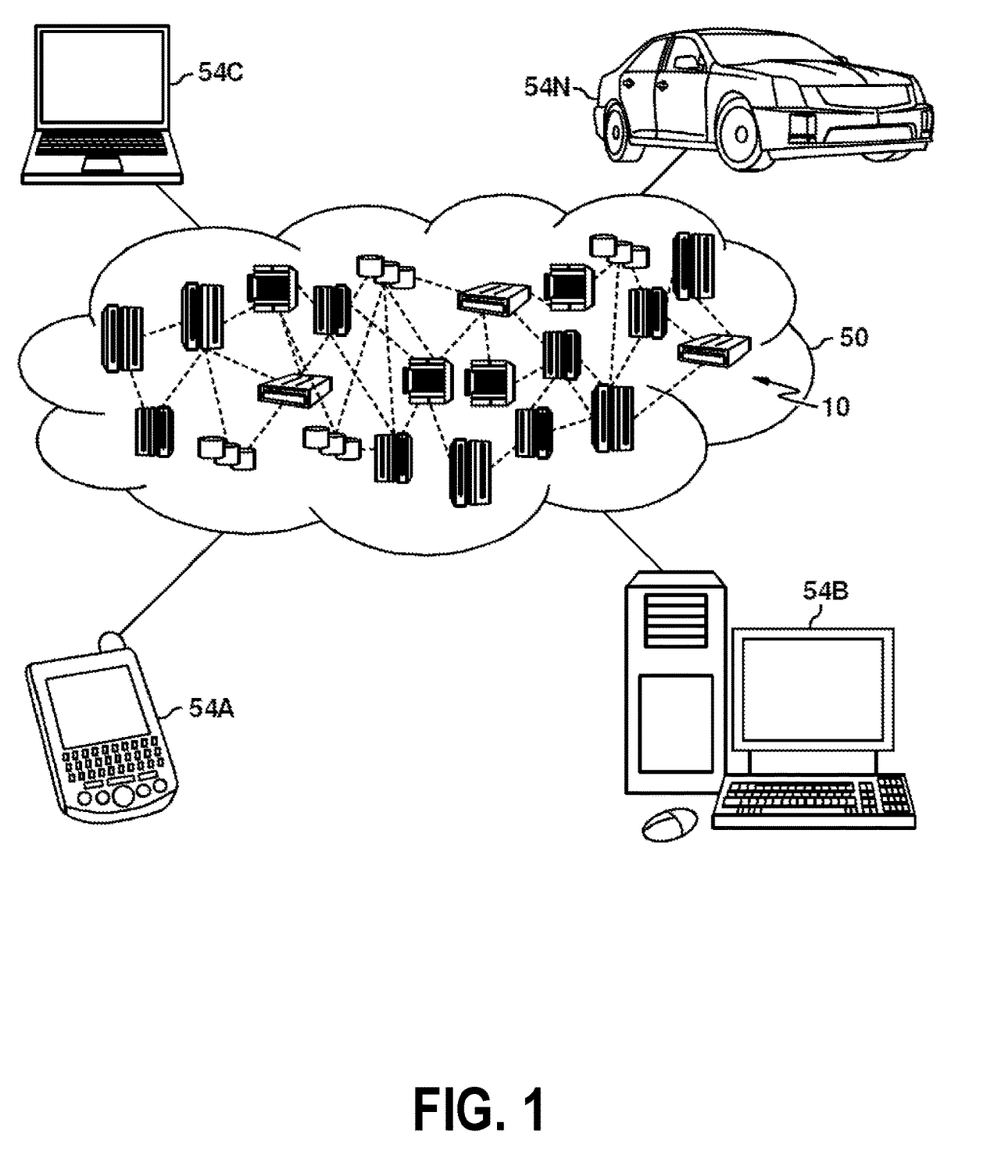
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
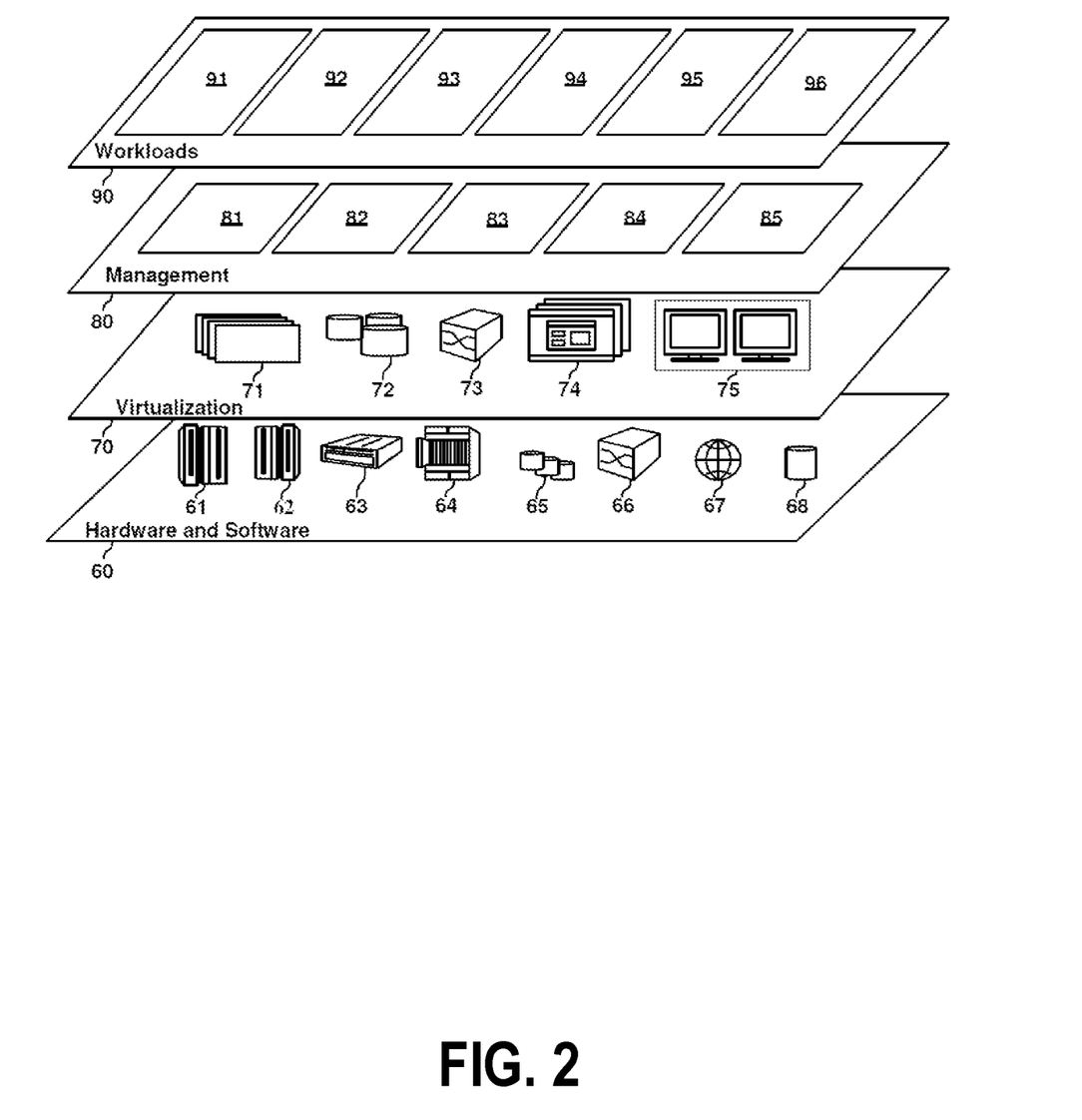
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex dynamic generation of web browser links based on cognitive analysis.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
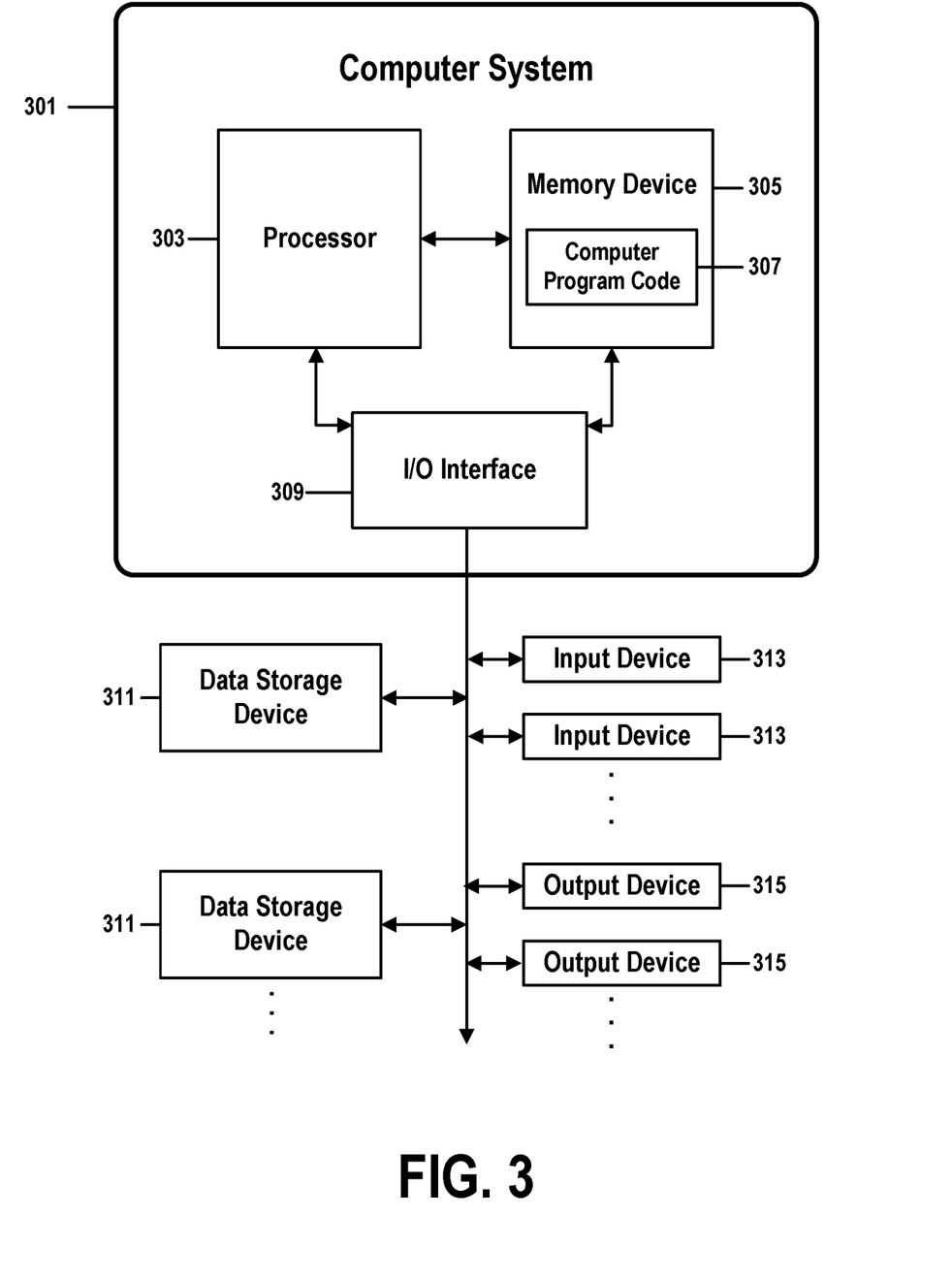
FIG. 3 shows the structure of a computer system and computer program code that may be used to implement a method for dynamic generation of web browser links based on cognitive analysis in accordance with embodiments of the present invention.

FIG. 3 shows a structure of a computer system and computer program code that may be used to implement a method for dynamic generation of web browser links based on cognitive analysis in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for dynamic generation of web browser links based on cognitive analysis in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for dynamic generation of web browser links based on cognitive analysis.

Any of the components of the present invention could be created, integrated, hosted, maintained, deployed, managed, serviced, supported, etc. by a service provider who offers to facilitate a method for dynamic generation of web browser links based on cognitive analysis. Thus the present invention discloses a process for deploying or integrating computing infrastructure, comprising integrating computer-readable code into the computer system 301, wherein the code in combination with the computer system 301 is capable of performing a method for dynamic generation of web browser links based on cognitive analysis.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for dynamic generation of web browser links based on cognitive analysis may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for dynamic generation of web browser links based on cognitive analysis is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4A:
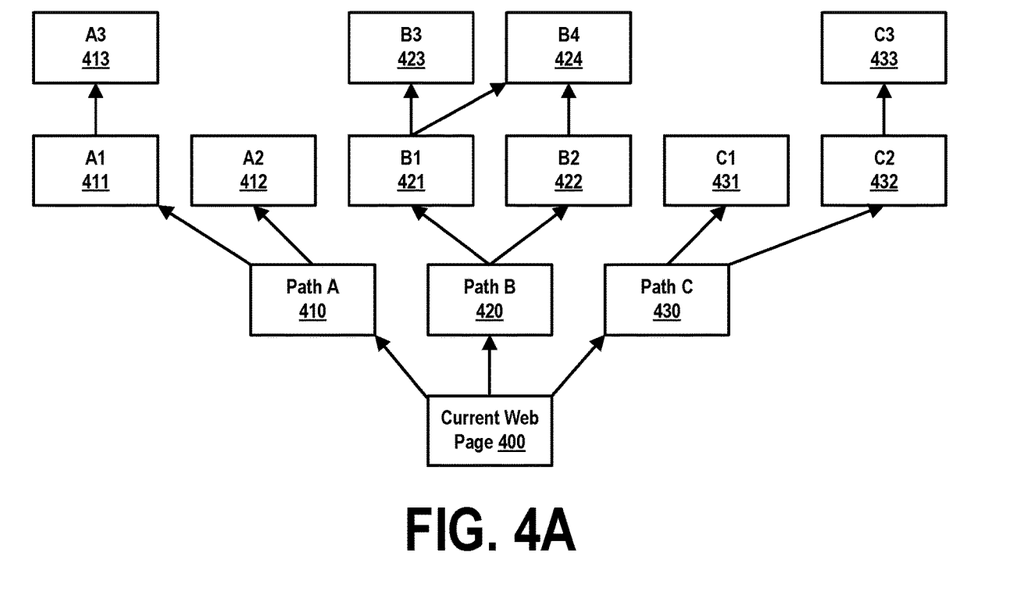
FIG. 4A shows paths that a user may traverse through a Web site.

FIG. 4A shows paths that a user may traverse through a Web site by means of a Web browser. FIG. 4A shows items 400-433.

Items 400-433 each represent a Web page. These pages may all be part of the same Web site or may span multiple sites. The arrows connecting pairs of items 400-433 represent hyperlinks that allow a user to navigate directly between a connected pair. For example, the arrow connecting items 410 and 412 represent that a user may navigate directly from page 410 to page 412 through a single hyperlink.

If a user is currently viewing Web page 400, that user may directly navigate to page A 410, B 420, or C 430. The user may then continue to hyperlink through a respective path A, B, or C to reach a final destination page A2 412 or A3 413 (through path A), B3 423 or B4 424 (through path B), or C1 431 or C3 433 (through path C).

Figure 4B:
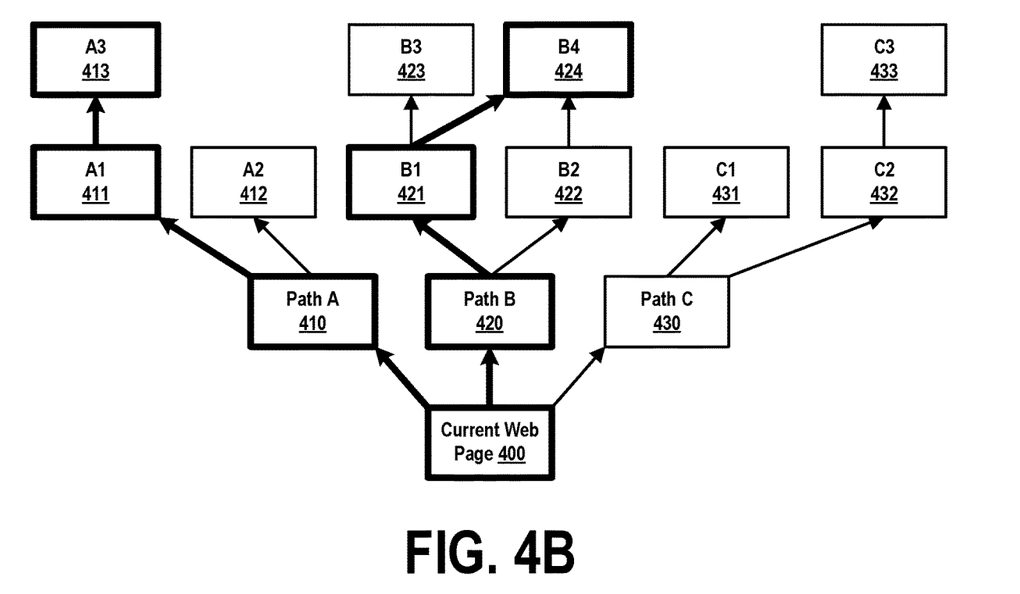
FIG. 4B shows paths that a user may traverse through a Web site in order to reach two particular final destinations.

FIG. 4B shows paths that a user may traverse through a Web site in order to reach two particular final destinations. FIG. 4B highlights paths that a user may traverse through a Web site in order to reach final destination A3 413 or B4 424. FIG. 4B shows items 400-433, which are identical in form and function to similarly numbered items in FIG. 4A.

In this example, a first set of highlighted Web pages and paths show a path through which a user may navigate from current Web page 400 to a final-destination Web page A3 413. This path requires the user to select three hyperlinks that traverse Web pages 410, A1 411, and A3 413.

Similarly, a second set of highlighted Web pages and paths show a path through which a user may navigate from current Web page 400 to a final-destination Web page B4 424. This path requires the user to select three hyperlinks that traverse Web pages 420, B1 421, and B4 424.

Figure 5:
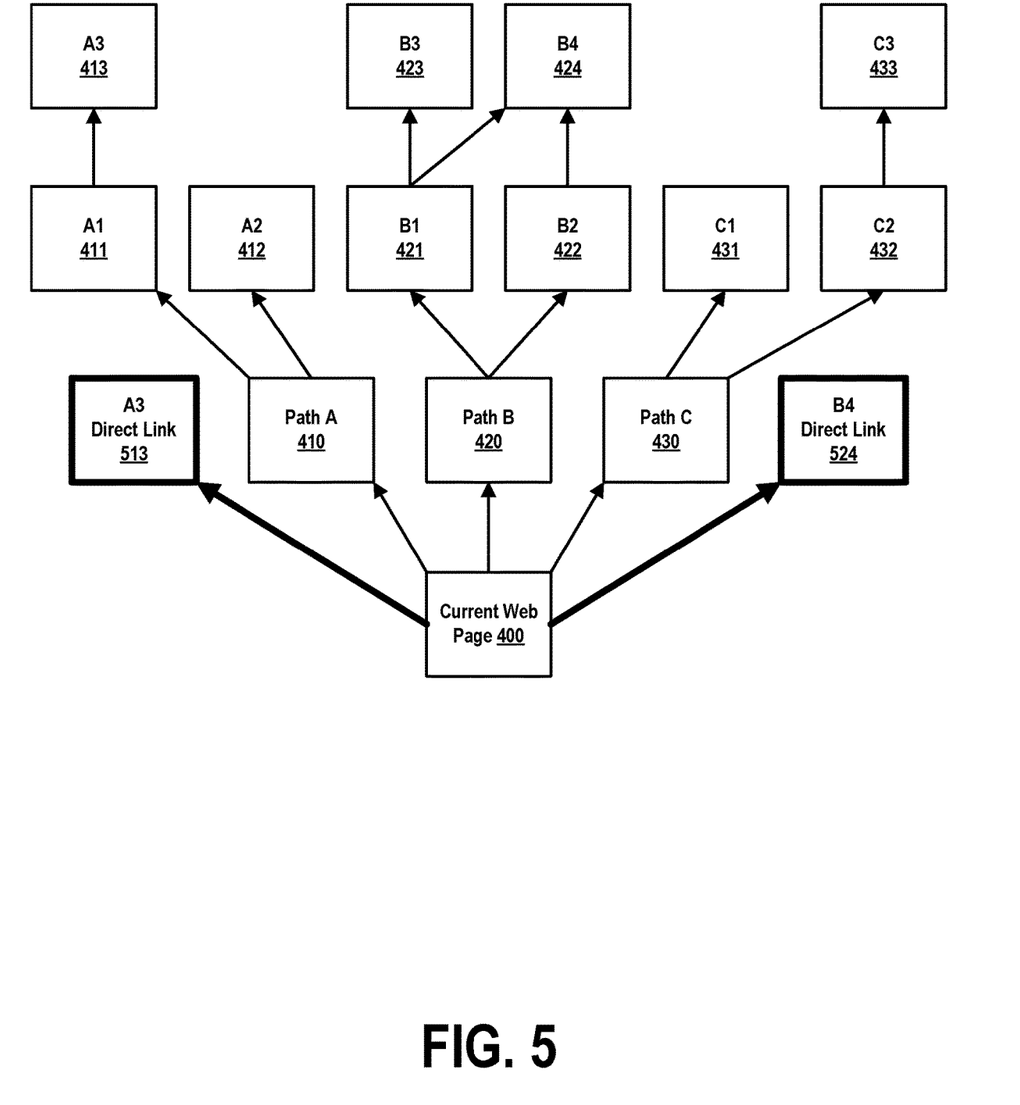
FIG. 5 shows streamlined navigation paths provided by embodiments of the present invention, that allow a user to more quickly reach the two particular final destinations of FIG. 4B.

FIG. 5 shows streamlined navigation paths provided by embodiments of the present invention, that allow a user to more quickly reach either of the two final destinations of FIG. 4B. FIG. 5 shows items 400-433, 511, and 524.

FIG. 5 shows two new direct links, generated by embodiments of the present invention, that allow a user to directly navigate from a current Web page 400 to either the first final-destination Web page A3 or the second final-destination Web page B4. These two pages are represented in FIG. 5, respectively, by items 513 and 524, which represent the same pages represented in FIGS. 4A and 4B by items 413 and 424.

These direct links reduce the number of hyperlinks through which a user must navigate in order to reach either final destination from three hyperlinks to one hyperlink. This mechanism increases the efficiency and ease of use of the Web browser, and decreases the complexity of the user's experience while navigating through a Web site.

Figure 6:
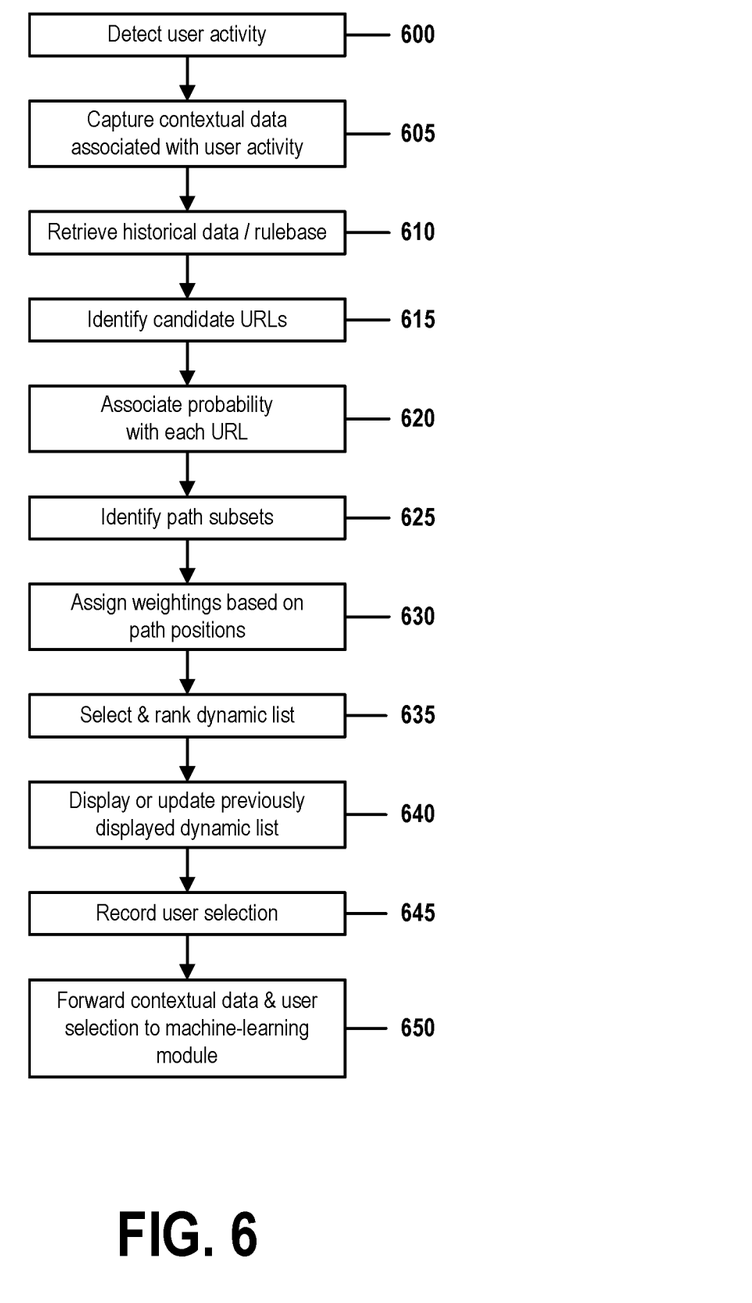
FIG. 6 is a flow chart that illustrates the steps of a method for dynamic generation of web browser links based on cognitive analysis, in accordance with embodiments of the present invention.

FIG. 6 is a flow chart that illustrates the steps of a method for dynamic generation of web browser links based on cognitive analysis, in accordance with embodiments of the present invention. FIG. 6 shows steps 600-650.

In step 600, an improved, artificially intelligent, self-learning Web browser system detects that a user has performed a navigational task, such as displaying a particular Web page, or selecting a hyperlink embedded into a particular Web page.

In step 605, the browser system, in response to the detection, captures contextual data that characterizes the user activity. As noted above, this capturing is enabled only if the user has expressly consented to the capture, tracking, or other access of information related to the user's personal identification or activities. This data comprises information associated with the user and with the Web pages selected or viewed by the user. Although the present invention is flexible enough to accommodate the capture of any type of contextual data preferred by an implementer, embodiments and examples shown in FIG. 6 consist of:

- a User ID that uniquely identifies the user or an account of the user,
- an identifier of the Web page currently being viewed by the user (such as a URL) and, if the user has selected a hyperlink from that page, an identifier of the page to which the user is attempting to link,
- the current time, date, day of the week, month, or other temporal identifier,
- the geographic location of the user, such as the user's address, city, region, country, or computing site,
- the Web browser being used by the user, and
- a unique identifier of the computer being used by the user to run the Web browser.

In step 610, the system retrieves extrinsic information that allows the system to apply cognitive analytics to the user's navigational steps.

This extrinsic information may comprise historical records or logs that record the user's prior navigational path from the currently viewed page. Those records may correlate prior navigational decisions with the first hyperlink selected from the current page, and with combinations of the other contextual information retrieved in step 605.

Any information, extrinsic or otherwise, that comprises historical activities, personally identifying information, or any other information associated with a user is captured only with that user's consent. In such cases, a user will be required to expressly opt-in or opt-out of capture or to otherwise expressly submit permissions allowing the system to capture or access such information.

For example, the historical information may allow correlations between the user's navigational path from the current page and combinations or subset of: the time of day or day of the week at which the user had in the past viewed the current page or selected a particular hyperlink from the current page; the computer or Web browser used by the user when viewing the current page during previous sessions; or the geographical location of the user when viewing the current page during previous sessions. The historical information may also allow correlations with similar navigational decisions made by other users from the same Web page.

In other cases, the extrinsic information may comprise rules stored in a rule-base generated by the browser or by a training module of a machine-learning component of the browser. These rules may have been inferred during machine-training sessions from historical information, similar to the information described above, or from other extrinsic sources capable of allowing the artificially intelligent, self-learning Web browser infer correlations and rules for predicting a user's navigational decisions.

In step 615, the system uses inferences and correlations derived from the extrinsic information to predict the user's most likely final-destination Web pages and the navigational paths that the user is likely to traverse in order reach those final-destination pages. These identifications of the most likely candidate pages may be made through any means of artificial intelligence or cognitive analytics known in the art.

For example, the rule-base could contain a previously learned rule stating that, if the user, using the employer-owned workstation and Web browser assigned to the user, views the home page of the employer's Web site at approximately 9:00 AM on a workday, the user has in the past most often next navigated through the Web site to either the site's Daily Bulletin page or to the site's internal messaging function. From this rule, the system could infer that, because the user is viewing that home page at 8:52 AM on a Tuesday, using the employer's browser on the user's work computer, the user's next destination will likely be either the Bulletin page or the messaging page.

In addition to identifying a set of candidate final-destination pages in this manner, the system will also identify Web pages along each path from the user's currently viewed page to each identified candidate final-destination page. The paths and the Web pages along these paths may be identified through known methods of artificial intelligence or cognitive analytics, similar to the methods used to identify the candidate final-destination pages.

For example, if a user is currently viewing Web page 400 of FIG. 4B, the system may in step 615 determine that the user will most likely next want to navigate to either Web page A3 413 or to Web page B4 424. If the former, the user would most likely traverse path A from current page 400 through pages 410 and A1 411, ending at page A3 413. If the latter, the user would most likely traverse path B from current page 400 through pages 420 and A1 421, ending at page B4 424.

In step 620, the system assigns to each Web page identified in step 615 a relative probability that the user will next navigate through that page. For example, if the user has in the past, in the presence of similar context, navigated 30% of the time to page A3 413, 60% of the time to page B4 424, and 10% of the time elsewhere, the system might assign a probability of 0.3 to pages 410, 411, and 413 and 0.6 to pages 420, 421, and 424.

Embodiments of the present invention are also flexible enough to accommodate any other method of assigning probability that is desired by an implementer. For example, if an implementer wishes to ignore the probability that the user will navigate to an unknown site, those probabilities could be ignored. In such a case, the system might assign a probability of 1.0 to pages 410, 411, and A3 413 and 2.0 to pages 420, 421, and B4 424, representing that the user is twice as likely to select the latter path.

In some embodiments, more complex algorithms may be used to select probabilities, based on the occurrence of concurrent conditions or combinations of correlated factors. In some cases, additional factors, such as weather conditions, news events, the occurrence of a holiday, or a Web-site redesign, may also be factored in. In all cases, the system will intelligently select appropriate probabilities using methods of cognitive analytics or other artificially intelligent methods, based on rules and inferences derived from prior machine-learning training sessions.

In step 625, the system optionally selects subsets of the candidate Web pages identified in the previous steps. This selection may be performed, for example, by eliminating any sites associated with probabilities less than a predefined acceptable threshold-probability value. In the preceding example, if a threshold value is 40% probability, then pages 420, 421, and 424, which had each been assigned a probability of 60%, would be selected. Pages 410, 411, and 413, which had each been assigned a probability of 30%, would not be included in the sub set.

This threshold value may be selected arbitrarily, may be defined as a function of a mean or median probability of all candidate Web pages or of all Web pages in the subsets, or may be selected empirically by a trial-and-error method that iteratively adjusts the threshold value to produce the best results during repeated performances of the method of FIG.

In step 630, the system optionally weights the probabilities of Web pages in the subset, such that a page that is a final destination of a path is given a greater weight. For example, if all three Path B pages 420, 421, and 424 are associated with a path probability of 0.60, final-destination page B4 424 could be weighted by 20% to give page B4 424 a probability of 0.72 (120% of 0.6=0.72). In this manner, the final-destination page of each path will be associated with a probability that is higher than that of any other page in the same path.

In step 635, a dynamic list of suggest Web pages is selected from the subsets. This list may be selected by any means known in the art, but in the simplest case, the system selects all pages associated with probabilities that exceed a second predetermined threshold value. This second threshold value may be selected arbitrarily, may be defined as a function of a mean or median probability of all candidate Web pages or of all Web pages in the subsets, or may be selected empirically by a trial-and-error method that iteratively adjusts the threshold value to produce the best results during repeated performances of the method of FIG. 6.

The Web pages in the dynamic list will be ranked, ordered, or sorted as a function of the values of the probability values associated with each page in the list. In some embodiments, the system will retain only final-destination pages, but other embodiments may rely upon the weighting function of step 630 to ensure that final-destination pages are given sufficient priority while not omitting other pages along each path.

In step 640, the system allows the user to select a Web page from the dynamic list. This may be performed by any means known in the art, such as by displaying the list in a pop-up window or drop-down list of hyperlinked, named Web pages. For example, the dynamic list may be displayed in a persistent or always-on-top window that is continuously updated in real time by repeating steps 600-635 every time the user selects another Web page. Note that the user may not be required to select a link from the dynamic list, and may, if desired, be allowed to instead navigate to any other Web page that would normally be accessible from the currently viewed page.

In some embodiments, the displayed list will contain only final-destination Web pages, omitting other pages on each path. For example, in FIG. 5, the system would display only page A3 513 and page B4 524, omitting intermediate pages 410, 411, 420, and 421.

In step 645, the browser system records the user's selection from the dynamic list. The system routes the user directly to the selected page without requiring the user to traverse any intervening pages between the user's original, current, page and the selected page. For example, if the user selects a final-destination Web page, system routes the user directly to the selected final-destination page. Once the user has been routed to the selected page, the system repeats the procedure of steps 600-640 in order to dynamically update the dynamic list and allow the user to select another page predicted by the system to be the user's likely next destination.

In step 650, the system forwards relevant information to a training module of a machine-learning function. The machine-learning function may be an internal component of the Web-browser system or may be an external application. This information will be used to further train the browser and to update rule-base or knowledgebase rules from which the system attempts to predict a user's navigational patterns.

The relevant information may include any information from which inferences or correlations may be made, such as the contextual information, the extrinsic information, the dynamic list, and the user's response to the display of the dynamic list in step 640.

At the conclusion of step 650, the browser system may return to step 600 in order to detect the user's next navigational decision, or may proceed through another iteration of the method of FIG. 6, considering the user's currently viewed Web page to be the page selected by the user from the dynamic list.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A Web browser system comprising a processor, a memory coupled to the processor, and a computer-readable hardware storage device coupled to the processor, the storage device containing program code configured to be run by the processor via the memory to implement a method for dynamic generation of web browser links based on cognitive analysis, the method comprising:
the system detecting that a user has selected a link from a first Web page to a second Web page;
the system capturing contextual data that characterizes the user's selection;
the system using cognitive analysis to intelligently infer from historical records a set of Web pages, where each page of the set of Web pages is associated with a probability that the user will next traverse a path of Web pages;
the system ranking each Web page of the set of Web pages as a function of the probabilities, where the ranking comprises increasing a probability associated with a page of the set of Web pages that is a final destination of a path comprised by the set of Web pages;
the system selecting a subset of Web pages from the set of Web pages; and
the system displaying the subset as a hyperlinked dynamic list, such that the user may navigate to any page of the subset with a single selection from the dynamic list.

2. The system of claim 1, further comprising:
the system, upon detecting a user selection from the dynamic list, automatically updating the dynamic list by repeating the detecting, the capturing, the using cognitive analysis, the selecting a subset, the ranking, and the displaying.

3. The system of claim 1, where the subset consists of Web pages associated with probabilities that exceed a predetermined threshold value.

4. The system of claim 1, where the captured contextual data consists of identifiers of the user, of the first and second Web pages, of a location of the user, of current temporal data, of a Web browser being used by the user, and of a computer being used by the user to run the Web browser.

5. The system of claim 4, where the current temporal data is selected from the group consisting of: the current time, the current date, the current day of the week, the current month of the year, and the current day and month of the year.

6. The system of claim 1, further comprising:
the system forwarding the captured contextual data and the user's response to the displaying to a machine-learning component that uses the forwarded captured contextual data and the user's response to train the system to more accurately infer the set of Web pages and the probabilities.

7. The system of claim 1, where the intelligently inferring further comprises inferring the probabilities by correlating the captured contextual data with patterns inferred from previously captured contextual data comprised by the historical records.

8. A method for dynamic generation of web browser links based on cognitive analysis, the method comprising:
a Web browser system detecting that a user has selected a link from a first Web page to a second Web page;
the system capturing contextual data that characterizes the user's selection;
the system using cognitive analysis to intelligently infer from historical records a set of Web pages, where each page of the set of Web pages is associated with a probability that the user will next traverse a path of Web pages;
the system ranking each Web page of the set of Web pages as a function of the probabilities, where the ranking comprises increasing a probability associated with a page of the set of Web pages that is a final destination of a path comprised by the set of Web pages;
the system selecting a subset of Web pages from the set of Web pages; and
the system displaying the subset as a hyperlinked dynamic list, such that the user may navigate to any page of the subset with a single selection from the dynamic list.

9. The method of claim 8, further comprising:
the system, upon detecting a user selection from the dynamic list, automatically updating the dynamic list by repeating the detecting, the capturing, the using cognitive analysis, the selecting a subset, the ranking, and the displaying.

10. The method of claim 8, where the subset consists of Web pages associated with probabilities that exceed a predetermined threshold value.

11. The method of claim 8, where the captured contextual data consists of identifiers of the user, of the first and second Web pages, of a location of the user, of current temporal data, of a Web browser being used by the user, and of a computer being used by the user to run the Web browser, and where the current temporal data is selected from the group consisting of: the current time, the current date, the current day of the week, the current month of the year, and the current day and month of the year.

12. The method of claim 8, further comprising:

the system forwarding the captured contextual data and the user's response to the displaying to a machine-learning component that uses the forwarded captured contextual data and the user's response to train the system to more accurately infer the set of Web pages and the probabilities.

13. The method of claim 8, where the intelligently inferring further comprises inferring the probabilities by correlating the captured contextual data with patterns inferred from previously captured contextual data comprised by the historical records.

14. The method of claim 8, further comprising providing at least one support service for at least one of creating, integrating, hosting, maintaining, and deploying computer-readable program code in a computerized Web browse system, wherein the computer-readable program code in combination with the computerized Web browser system is configured to implement the detecting, the capturing, the using cognitive analysis, the selecting a subset, the ranking, and the displaying.

15. A computer program product, comprising a computer-readable hardware storage device having a computer-readable program code stored therein, the program code configured to be executed by a Web browser system comprising a processor, a memory coupled to the processor, and a computer-readable hardware storage device coupled to the processor, the storage device containing program code configured to be run by the processor via the memory to implement a method for dynamic generation of web browser links based on cognitive analysis, the method comprising:

the system detecting that a user has selected a link from a first Web page to a second Web page;

the system capturing contextual data that characterizes the user's selection;

the system using cognitive analysis to intelligently infer from historical records a set of Web pages, where each page of the set of Web pages is associated with a probability that the user will next traverse a path of Web pages;

the system ranking each Web page of the set of Web pages as a function of the probabilities, where the ranking comprises increasing a probability associated with a page of the set of Web pages that is a final destination of a path comprised by the set of Web pages;

the system selecting a subset of Web pages from the set of Web pages; and the system displaying the subset as a hyperlinked dynamic list, such that the user may navigate to any page of the subset with a single selection from the dynamic list.

16. The computer program product of claim 15, further comprising:

the system, upon detecting a user selection from the dynamic list, automatically updating the dynamic list by repeating the detecting, the capturing, the using cognitive analysis, the selecting a subset, the ranking, and the displaying.

17. The computer program product of claim 15, where the subset consists of Web pages associated with probabilities that exceed a predetermined threshold value.

18. The computer program product of claim 15, where the captured contextual data consists of identifiers of the user, of the first and second Web pages, of a location of the user, of current temporal data, of a Web browser being used by the user, and of a computer being used by the user to run the Web browser, and where the current temporal data is selected from the group consisting of: the current time, the current date, the current day of the week, the current month of the year, and the current day and month of the year.

19. The computer program product of claim 15, where the intelligently inferring further comprises inferring the probabilities by correlating the captured contextual data with patterns inferred from previously captured contextual data comprised by the historical records.

\* \* \* \* \*